United States Patent
Kuwahara et al.

(10) Patent No.: US 9,936,087 B2
(45) Date of Patent: Apr. 3, 2018

(54) PRINTING APPARATUS, ELECTRONIC DEVICE, CONTROL PROGRAM, AND OPERATION PARAMETER SETTING METHOD OF PRINTING APPARATUS

(71) Applicant: Seiko Epson Corporation, Tokyo (JP)

(72) Inventors: Yuki Kuwahara, Shiojiri (JP); Tatsuo Akasaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/410,398

(22) Filed: Jan. 19, 2017

(65) Prior Publication Data
US 2017/0264761 A1 Sep. 14, 2017

(30) Foreign Application Priority Data
Mar. 14, 2016 (JP) .................................. 2016-049268

(51) Int. Cl.
| | |
|---|---|
| *G06F 15/00* | (2006.01) |
| *G06F 3/12* | (2006.01) |
| *G06K 1/00* | (2006.01) |
| *H04N 1/00* | (2006.01) |

(52) U.S. Cl.
CPC ..... *H04N 1/00411* (2013.01); *H04N 1/00416* (2013.01); *H04N 1/00482* (2013.01); *H04N 2201/0082* (2013.01)

(58) Field of Classification Search
CPC ........... H04N 1/00411; H04N 1/00416; H04N 1/00482; H04N 2201/0082
USPC ............................... 358/1.13, 1.15, 1.1, 1.14
See application file for complete search history.

(56) References Cited

U.S. PATENT DOCUMENTS

| | | | | |
|---|---|---|---|---|
| 2013/0106842 A1* | 5/2013 | Miyazawa | .............. | G06F 3/041 345/419 |
| 2017/0118373 A1* | 4/2017 | Morita | ............... | H04N 1/32117 |

FOREIGN PATENT DOCUMENTS

JP 2010-146206 A 7/2010

* cited by examiner

*Primary Examiner* — Douglas Tran
(74) *Attorney, Agent, or Firm* — Nutter McClennen & Fish LLP; John J. Penny, Jr.

(57) ABSTRACT

A printing apparatus includes a printing unit that performs a printing operation, a print setting unit that performs setting of the printing operation, and a touch panel that displays an object related to the setting and receives a pressing operation. The touch panel displays operation objects corresponding to a multi-level changeable operation parameter of the printing operation and when the pressing operation is performed on a position where the operation object is displayed, the touch panel changes a temporary setting value of the operation parameter, which is shown by a display object displayed at a position different from that of the operation object, according to a magnitude of pressing force. The print setting unit decides the temporary setting value, which is obtained when a determination operation different from the pressing operation is performed, as a setting value of the operation parameter.

12 Claims, 7 Drawing Sheets

PRINTING APPARATUS, ELECTRONIC DEVICE, CONTROL PROGRAM, AND OPERATION PARAMETER SETTING METHOD OF PRINTING APPARATUS

BACKGROUND

1. Technical Field

The present invention relates to a technique of setting an operation parameter related to an operation of an electronic device such as, for example, a printing apparatus by using a touch panel.

2. Related Art

Electronic devices such as, for example, a printing apparatus, may be provided with a touch panel as an input device for a user to perform various setting operations. In this type of devices, various means to improve operability of the setting operation are employed. For example, a technique described in JP-A-2010-146206 is related to a display operation apparatus using a touchpad that can detect the magnitude of a pressing force. JP-A-2010-146206 discloses a technique in which multilevel threshold values are set with respect to the magnitude of the pressing force to the touch pad and one of parameter setting values that can be set to multiple levels is selected according to the magnitude of the pressing force (For example, FIG. 15).

The magnitude of the pressing force is subjective and relative for a general user who actually performs the operation. In other words, it is difficult for a person other than an expert to quantitatively know how strong the pressing force that is applied to the touch pad by the pressing operation of the person. In the related art described above, it is not possible for a user who is performing an operation to know how strong the pressing force being applied is, so that there are problems that a function different from that desired by the user is selected and it takes time to select a desired function. Therefore, the related art described above leaves room for improvement in that the setting should be quickly performed.

SUMMARY

Some aspects according to the invention have a configuration that can solve at least a part of the above problems and provide a technique where a user can quickly perform a desired setting when the user performs setting of an operation parameter by using a touch panel.

An aspect of the invention is a printing apparatus including a printing unit that performs a printing operation, a print setting unit that performs setting of the printing operation, and a touch panel that displays an object related to the setting and receives an operation input caused by pressure. The touch panel displays an operation object corresponding to a multi-level changeable operation parameter of the printing operation and when a pressing operation is performed on a position where the operation object is displayed, the touch panel changes a temporary setting value of the operation parameter, which is shown by a display object displayed at a position different from that of the operation object, according to a magnitude of a pressing force. The print setting unit decides the temporary setting value, which is obtained when a determination operation different from the pressing operation is performed, as a setting value of the operation parameter.

Another aspect of the invention is an operation parameter setting method of a printing apparatus. The operation parameter setting method includes displaying an operation object corresponding to a multi-level changeable operation parameter of a printing operation on a touch panel, when a pressing operation is performed on a position where the operation object is displayed, changing a temporary setting value of the operation parameter, which is shown by a display object displayed at a position different from that of the operation object on the touch panel, according to a magnitude of a pressing force, and deciding the temporary setting value, which is obtained when a determination operation different from the pressing operation is performed, as a setting value of the operation parameter.

Another aspect of the invention is an electronic device including a processing unit that performs a predetermined processing operation, a condition setting unit that sets a processing condition of the processing operation, and a touch panel that displays an object related to the setting and receives an operation input caused by pressure. The touch panel displays an operation object corresponding to a multi-level changeable operation parameter of the processing operation and when a pressing operation is performed on a position where the operation object is displayed, the touch panel changes a temporary setting value of the operation parameter, which is shown by a display object displayed at a position different from that of the operation object, according to a magnitude of a pressing force. The condition setting unit decides the temporary setting value, which is obtained when a determination operation different from the pressing operation is performed, as a setting value of the operation parameter.

According to the configurations described above, the display object which is displayed on the touch panel and shows the temporary setting value of the operation parameter changes according to a pressing force of a user to the touch panel. Therefore, the user can grasp a correspondence relationship between the pressing force and the value of operation parameter by seeing the display object that changes according to the pressing operation of the user. The user can quickly select a desired setting value by adjusting the pressing force while seeing the display object.

Further another aspect of the invention is a control program that causes a computer apparatus communicable with a printing apparatus to perform processing including causing a touch panel to display an operation object corresponding to a multi-level changeable operation parameter in a printing operation of the printing apparatus, when a pressing operation is performed on a position where the operation object is displayed, changing a temporary setting value of the operation parameter, which is shown by a display object displayed at a position different from that of the operation object on the touch panel, according to a magnitude of a pressing force, and deciding the temporary setting value, which is obtained when a determination operation different from the pressing operation is performed, as a setting value of the operation parameter. When the control program having the above configuration is installed in an appropriate computer apparatus, it is possible to cause the computer apparatus to operate as the electronic device described above.

In each aspect described above, for example, an operation in which a pressing position moves from a state in which the operation object is pressed may be defined as the determination operation. The above operation is, for example, an operation in which the user slides a finger pressing the operation object on the touch panel. Further, for example, a pressure applied to a position different from a position where the operation object is pressed may be defined as the determination operation. The above operation is, for example, an operation in which the user presses the touch panel with a finger different from the finger pressing the operation object.

In this way, a setting value is decided by regarding an operation input to the touch panel other than pressing the operation object as an indication of intention of determining a parameter by the user, so that it is possible to set an operation parameter by only an operation on the touch panel. Therefore, an operation parameter can be set by more quick and simple operation.

Further, for example, the touch panel may display a display object that meter-displays the magnitude of a temporary setting value of an operation parameter. When the operation parameter is represented by the magnitude of a quantity or a numerical value, if there is a meter-display that changes according to a pressing force, the user can more intuitively perceive a correspondence between the pressing force and the temporary setting value and quickly find a desired setting value.

Further, for example, the display object may be displayed near the operation object or near the pressing position. In a configuration as described above, the user need not largely move the line of sight in a series of operations from finding an operation object to be pressed to deciding the setting value, so that it is possible for the user to perform quicker setting operation.

All of a plurality of components included in each aspect of the invention described above are not necessarily indispensable. Some of the plurality of components can be appropriately changed, deleted, or replaced with other new components, and a part of limited content of these components can be deleted, for solving some or all of the problems described above or achieving some or all of the effects described herein. Further, in order to solve some or all of the above problems, or to achieve some or all of the effects described herein, it is possible to combine some or all of the technical features included in one embodiment of the invention described above with some or all of the technical features included in the other embodiment of the invention described above and create an independent embodiment of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
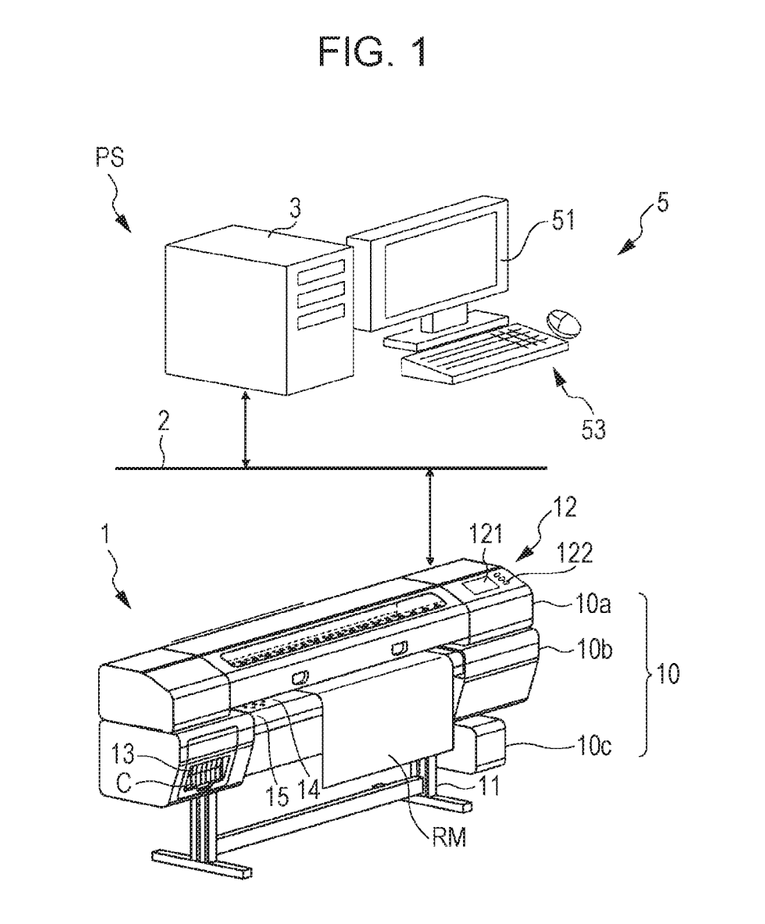
FIG. 1 is a diagram showing a print system including a printer of a first embodiment of the invention.

FIG. 1 is a diagram showing a print system including a printer, which is a first embodiment of the invention. As shown in FIG. 1, the print system PS includes a printer 1, a computer 3 that controls the printer 1, and a user interface apparatus 5 that is connected to the computer 3. The user interface apparatus 5 has a display 51 that performs display to a user and an input device 53 that includes a keyboard and a mouse and receives an input operation from the user. The printer 1 and the computer 3 are communicably connected to each other through an appropriate communication line 2 such as a LAN (Local Area Network) line and an Internet line.

In the print system PS, image data created by the computer 3 is transmitted through the communication line 2 and given to the printer 1. The printer 1 is a printing apparatus of a so-called ink jet method where ink droplets are discharged to a recording medium RM based on received image data and thereby an image corresponding to the image data is printed on the recording medium RM. As the recording medium RM, it is possible to use, for example, a cloth, a resin film, and the like in addition to a large-sized single sheet such as JIS standard A1 size paper and other paper such as a rolled paper having the same paper width as that of the large-sized single sheet.

The printer 1 has a housing 10 where three types of box members, that is, an upper box member 10a, a lower box member 10b, and a small box member 10c, are combined, and a leg portion 11 that supports the housing 10. The upper box member 10a and the lower box member 10b are stacked in a vertical direction. An operation panel 12 is provided on a front right portion of the upper box member 10a. A cartridge holder 13 into which an ink cartridge C containing ink is loaded is provided on a front left portion of the lower box member 10b.

The operation panel 12 is provided with a touch panel 121 having a function to display an image on a screen and a function to receive an operation input generated by a touch operation to the screen. Although described later in detail, various operation menus and parameters related to an operation of the printer 1 are displayed on the touch panel 121 by using appropriate image objects such as buttons and icons. When a user presses the touch panel 121, a function corresponding to a button displayed at a pressed position is performed. The touch panel 121 is provided in this way, so that a GUI (Graphical User Interface) environment to operate the printer 1 is provided to the user.

Further, the operation panel 12 is provided with a hardware key 122 where a function performed when being pressed is set in advance. It is possible to realize many operations even when using the operation panel 12 of a small area by performing operations, which are relatively less frequently performed, such as various setting operations, through the touch panel 121 described above. On the other hand, operations that are relatively frequently performed and operations that are required to be quickly performed when necessary, such as start and stop of printing, are assigned to the hardware key 122. For example, a push button can be used as the hardware key 122.

Although not shown in the drawings, in a rear portion of the lower box member 10b (rear side in FIG. 1), a spindle is provided horizontally and a roll is attached to the spindle. A long recording medium RM that has not been printed is wound around the roll and the recording medium RM can be pulled out from the roll to between the upper box member 10a and the lower box member 10b. Then the printer 1 discharges ink supplied from the ink cartridge C toward the recording medium RM by an ink jet method while supporting the recording medium RM, which is pulled out from the roll, by suction of a suction platen 14. Thereby, an image is printed on the recording medium RM. The recording medium PM printed in this way is sent to the front of the printer 1 and hangs down downward under its own weight along a guide surface 15 provided on a front surface of the printer 1.

Figure 2:
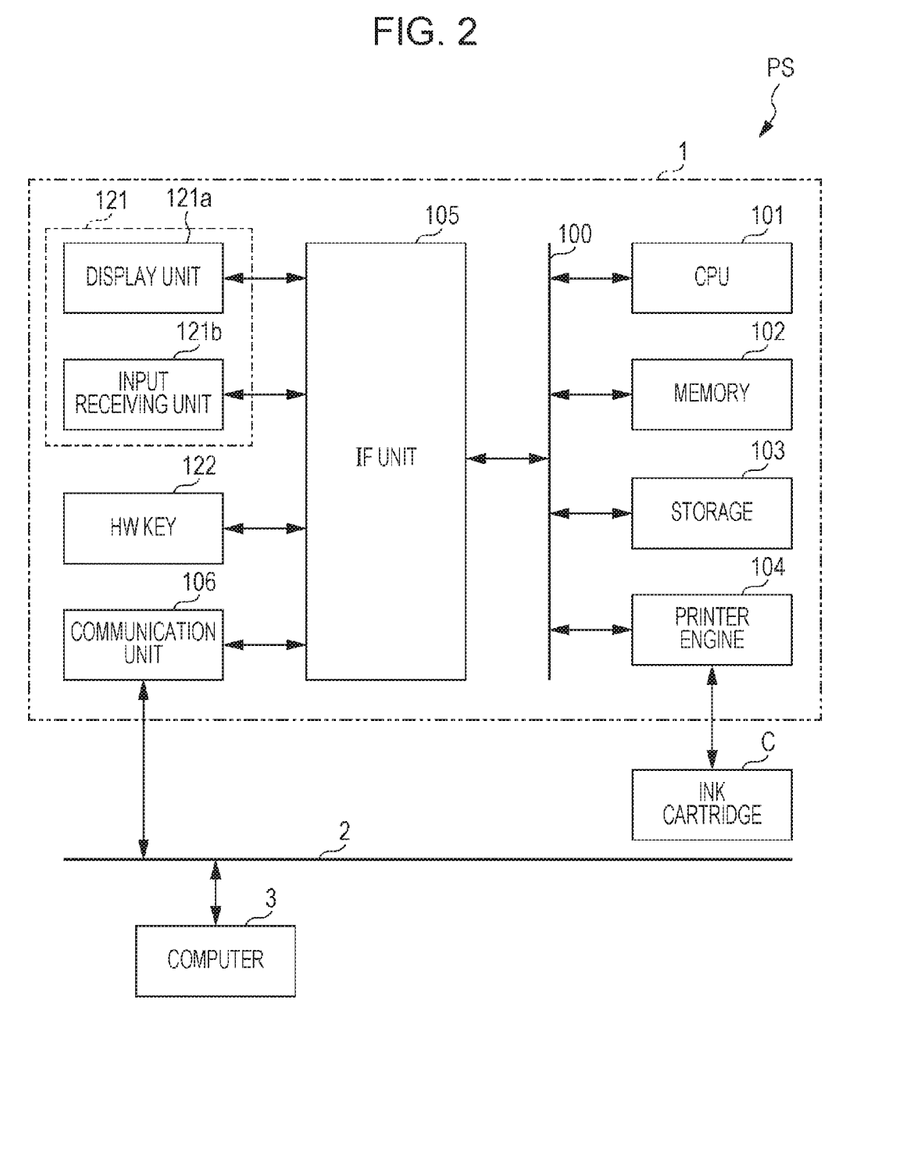
FIG. 2 is a block diagram showing an electrical configuration of the printer.

FIG. 2 is a block diagram showing an electrical configuration of the printer. The printer 1 includes a CPU 101, a memory 102, a storage 103, a printer engine 104, and an interface (IF) unit 105 and these components are communicably connected to each other through an internal bus 100.

The CPU 101 executes a predetermined control program and performs a printing operation by causing each component of the printer 1 to perform a predetermined operation. The memory 102 stores various data such as data necessary for processing and intermediate data generated by the CPU 101. The storage 103 has a storage capacity greater than that of the memory 102 and can perform long term data storage. The storage 103 stores various data such as a control program executed by the CPU 101 and image data given from the computer 3.

The printer engine 104 has hardware to form an image on the recording medium RM by using the ink in the ink cartridge C loaded into the cartridge holder 13 (FIG. 1) while transporting the recording medium RM. As a configuration of such hardware, a known configuration can be applied, so that detailed description will be omitted.

The IF unit 105 controls exchange of information between the printer 1, a user, and an external apparatus. Specifically, the IF unit 105 is connected with a touch panel 121, a hardware key (abbreviated as "HW key" in FIG. 2) 122, and a communication unit 106. The touch panel 121 includes a display unit 121a that displays an image and an input receiving unit 121b that receives a touch operation by outputting a signal corresponding to a pressing position to a display surface of the display unit 121a and a magnitude of a pressing force.

Content of the image displayed on the display unit 121a is determined by image data given from the CPU 101 through the IF unit 105. The signal related to the pressing position and the pressing force, which is outputted from the input receiving unit 121b, is transmitted to the CPU 101 through the IF unit 105. A signal that is outputted from the hardware key 122 due to pressing of the hardware key 122 is also transmitted to the CPU 101 through the IF unit 105. Thereby, the CPU 101 can grasp a user operation content inputted through the operation panel 12.

The communication unit 106 is connected to the communication line 2 and performs communication with an external apparatus such as the computer 3 through the communication line 2. Specifically, the communication unit 106 has functions to transfer a print command, image data, and the like transmitted from the computer 3 to the CPU 101 and transfer a progress status of processing in the printer 1 to the computer 3.

In the print system PS configured as described above, when a user creates image data by using an appropriate application program installed in the computer 3 and issues a print instruction, the image data and the print instruction are given to the printer 1 from the computer 3. The image data is stored in the storage 103. The CPU 101 that receives the print instruction executes a print processing program stored in the storage 103, controls each component to perform a printing operation, and forms an image corresponding to the image data on the recording medium RM. Such a series of operations is publicly known, so that detailed description will be omitted.

In the printer 1, a user can set various operation parameters (hereinafter simply referred to as "parameters") for specifying an operation condition of each component in the printing operation. An operation of the printer 1 for supporting a user's work of setting parameters as described above will be described below. The printer 1 displays GUI screens such as various menu screens on the touch panel 121 for enabling a user to efficiently set various parameters, receives touch operations performed on the touch panel 121 by the user, and determines each operation parameter. The above processing is realized when the CPU 101 executes a parameter setting processing program stored in the storage 103 in advance.

Figure 3:
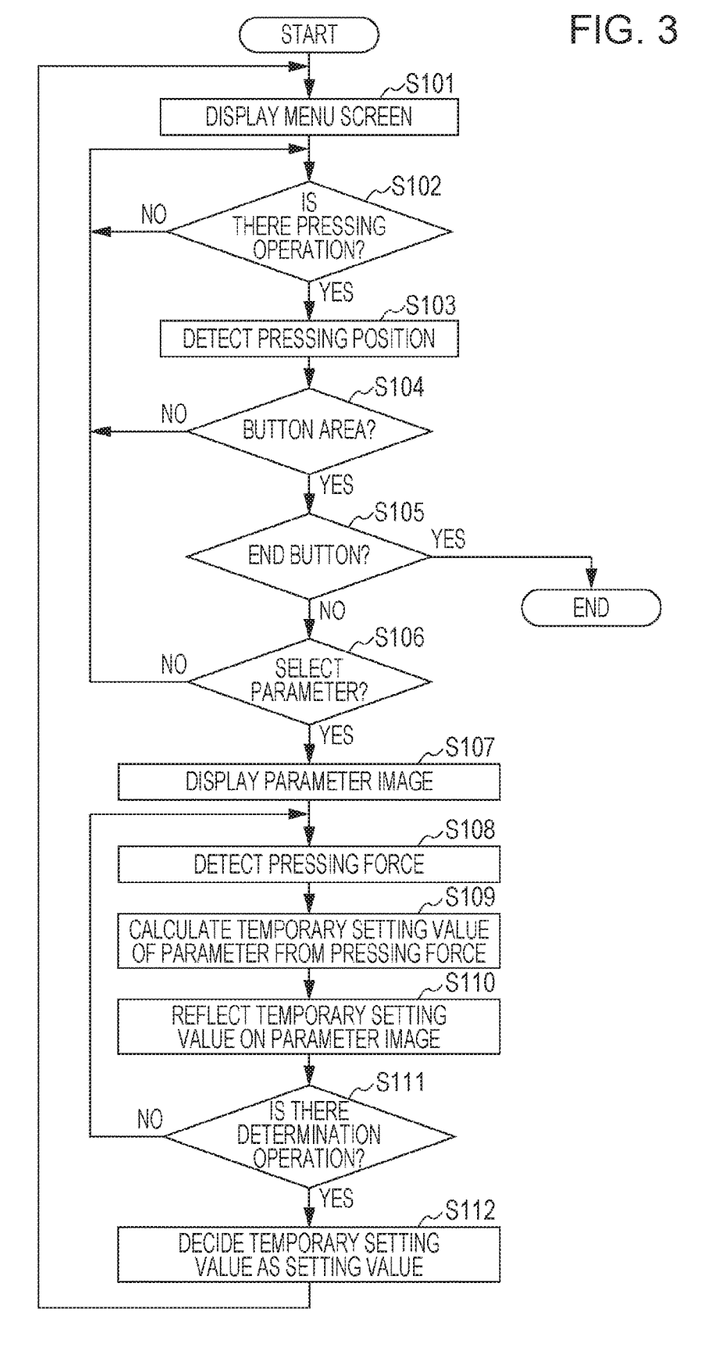
FIG. 3 is a flowchart showing parameter setting processing.

FIG. 3 is a flowchart showing parameter setting processing. When an instruction to perform a parameter setting operation is issued by an operation input of a user, the CPU 101 performs the parameter setting processing shown in FIG. 3. First, the CPU 101 displays a print setting menu screen in which a list of parameters that can be set is shown (step S101).

Figure 4:
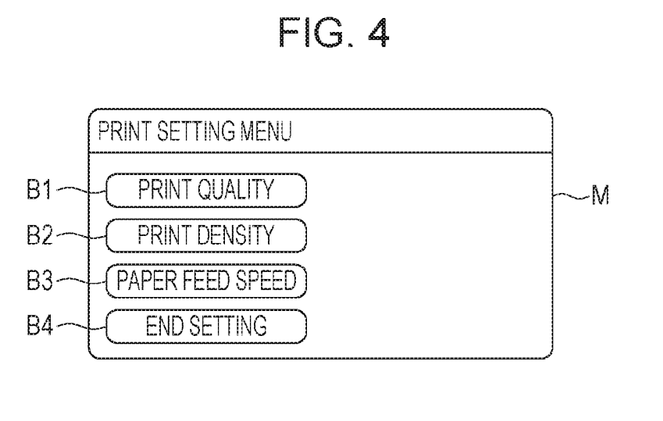
FIG. 4 is a diagram showing an example of a print setting menu screen.

FIG. 4 is a diagram showing an example of the print setting menu screen. In the print setting menu screen M illustrated here, as names of parameters that can be set, "print quality", "print density", and "paper feed speed" are displayed in frames of a predetermined size. Each of image objects specified as an area enclosed by the frame functions as button B1, B2, or B3 to select a corresponding parameter as a parameter to be set. An "end setting" button B4 for ending the setting operation is also provided.

When it is detected that a pressing operation of a user is performed on the touch panel 121 (step S102), the CPU 101 detects what position is pressed on the touch panel 121 based on a signal outputted from the touch panel 121 (step S103). When the pressed position is within a button area where any one of the buttons is arranged (step S104), if the button is the end setting button B4, the processing ends (step S105).

On the other hand, when the pressed button is any one of the buttons B1 to B3 corresponding to a parameter, it is assumed that a parameter corresponding to the pressed button is selected as a parameter to be set (step S106). In this case, a parameter image corresponding to the pressed button is displayed near the pressed button (step S107). The parameter image is an image object showing a current setting status of the parameter.

Figure 5:
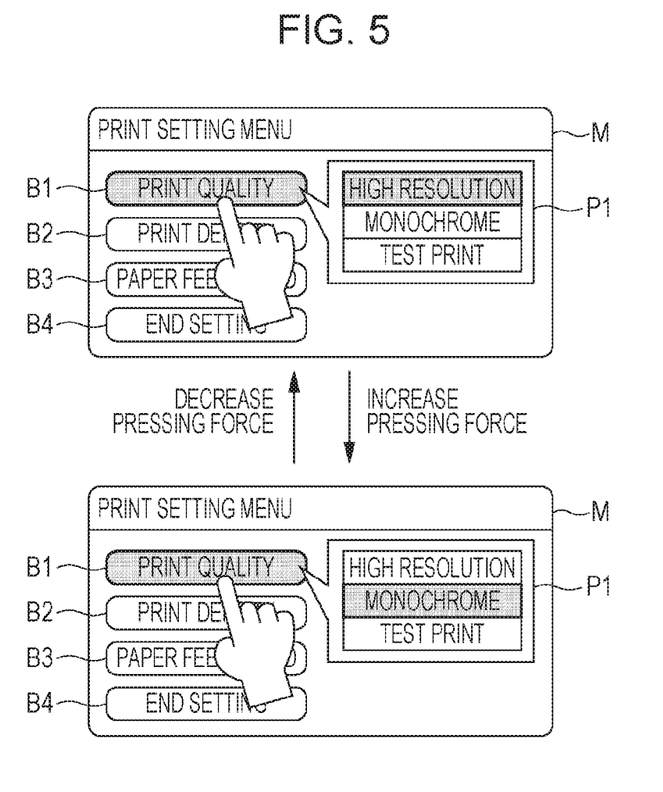
FIG. 5 is a diagram showing an example of a parameter image.

FIG. 5 is a diagram showing an example of the parameter image. For example, when the button B1 corresponding to a "print quality" parameter is selected by a user's pressing operation, a parameter image P1 including a list of setting values "high resolution", "monochrome", "test print", and the like, one of which may be taken as the parameter, are displayed near the button B1. A current temporary setting value in the list shown in the parameter image P1 is displayed in an appearance different from that of the other setting values, and thereby a user can know a current setting status. In an upper portion of FIG. 5, a field of "high resolution" is highlighted to show that the current temporary setting value of the "print quality" parameter is "high resolution".

A portion to be highlighted varies according to the magnitude of pressing force that presses the button B1. Specifically, the magnitude of the pressing force to the touch panel 121 is detected based on a signal outputted from the touch panel 121 (step S108), a temporary setting value of a parameter is calculated according to a result of the detection (step S109), and a display content of the parameter image P1 is changed to a display content that shows the obtained temporary setting value (step S110).

In the example of FIG. 5, when the pressing force is smaller than a certain threshold value, the temporary setting value of the "print quality" parameter is determined to be "high resolution", and in the parameter image P1, the field of "high resolution" is highlighted as shown in the upper portion of FIG. 5. When the pressing force exceeds the threshold value, the temporary setting value is changed to "monochrome" and the field of "monochrome" is highlighted as shown in a lower portion of FIG. 5. Although not shown in the drawings, when the pressing force further increases and exceeds a second threshold value, the field of "test print" is highlighted. On the other hand, when the pressing force is gradually reduced, accordingly the temporary setting value and the highlighted display are changed in order from "test print" to "monochrome" to "high resolution".

In this way, the temporary setting value of parameter displayed in the parameter image P1 changes according to the magnitude of the pressing force to the touch panel 121. A user can intuitively grasp a relationship between the magnitude of the pressing force and the temporary setting value of parameter by seeing the parameter image P1. When the user performs a determination operation different from the pressing operation of the buttons B1 to B3 (step S111), the temporary setting value at that time is decided as the setting value of the parameter (step S112). For example, as shown in the lower portion of FIG. 5, in a state in which the "monochrome" field is highlighted in the parameter image P1, when the user performs the determination operation, the setting value of the "print quality" parameter becomes "monochrome".

The user can set the setting value of the parameter to his or her own desired value by adjusting the pressing force to the button to change the temporary setting value of the parameter and performing the determination operation when the temporary setting value corresponds to the desired setting. The temporary setting value of the parameter accompanying the change of the pressing force is displayed as the parameter image P1 arranged near the pressed button. Therefore, the user can quickly and reliably set the parameter to his or her desired setting value. When one parameter is set in this way, the display returns to the original print setting menu screen M (step S101). The user can continuously perform setting of another parameter.

Figure 6:
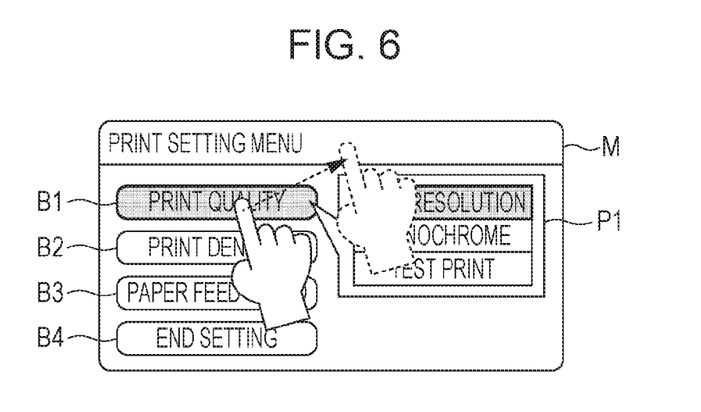
FIG. 6 is a first diagram showing an example of a determination operation.
Figure 7:
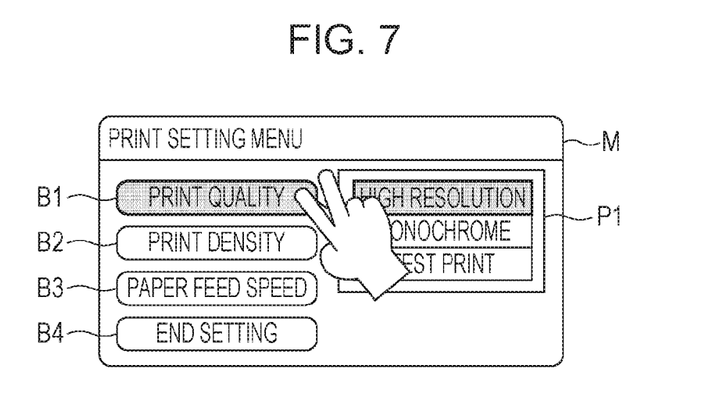
FIG. 7 is a second diagram showing an example of the determination operation.

FIGS. 6 and 7 are diagrams showing an example of a determination operation. In a state in which any one of the buttons B1 to B3 showing a type of parameter is pressed and a parameter image is displayed (that is, the temporary setting value of the parameter is displayed), when a specific operation different from the pressing operation of the button is performed, the operation is assumed as the determination operation. For example, as shown in FIG. 6, when the user presses the button B1 with a finger (solid line) and then quickly slides the finger and moves the pressed position to outside of the button while touching the touch panel 121 with the finger (dotted line), such an operation can be defined as the determination operation. Such an operation is called a flick operation or a swipe operation.

Further, for example, as shown in FIG. 7, an operation of pressing an area other than the button B1 with a finger while pressing the button B1 with another finger (multi-touch operation) can be defined as the determination operation. Further, various operation inputs can be used as the determination operation, such as, for example, a pressing operation to a specific position (for example, a position where a "determination" button is displayed) on the touch panel 121 and an operation of maintaining a displayed temporary setting value without changing it for a predetermined period of time.

In this way, an operation different from the pressing operation to a button corresponding to a parameter is defined as the determination operation, so that it is possible to complete the parameter setting operation by only an operation input to the touch panel 121. Thereby, the user can quickly perform the parameter setting. However, the determination operation is not limited to the operation input to the touch panel 121. For example, a predetermined operation input to the hardware key may be the determination operation.

The parameter image is preferred to be displayed near a button which the user presses or near a position which the user presses. The user selects a button which the user wants to set from the buttons displayed on the touch panel 121 and presses the button. Therefore, when the temporary setting value of the parameter is displayed near the position which the user presses, the user need not largely move the line of sight during operation. Further, when an image object that changes according to the pressing force is located near the pressing position to which the user pays attention, the image object is naturally within the visual field of the user, so that the user can easily know the current temporary setting value. Because of these, the setting operation of the user is effectively supported, so that the user can perform quick and reliable setting.

As another method, a display mode is considered in which a display content of a pressed button is changed according to the magnitude of the pressing force. However, for example, when assuming that the user presses the touch panel with a finger, displaying the parameter setting value at a position that may be blocked by a finger or a hand is not necessarily effective for the user. It is desirable to display the parameter image near the pressed position by considering from what direction the user performs operation on the touch panel 121.

Figure 8:
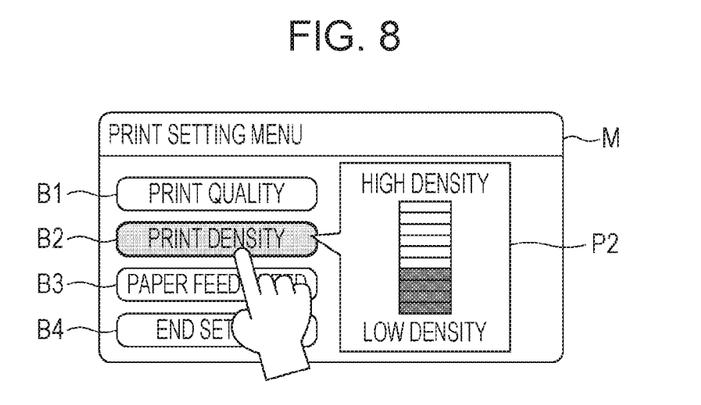
FIG. 8 is a first diagram showing another example of the parameter image.
Figure 9:
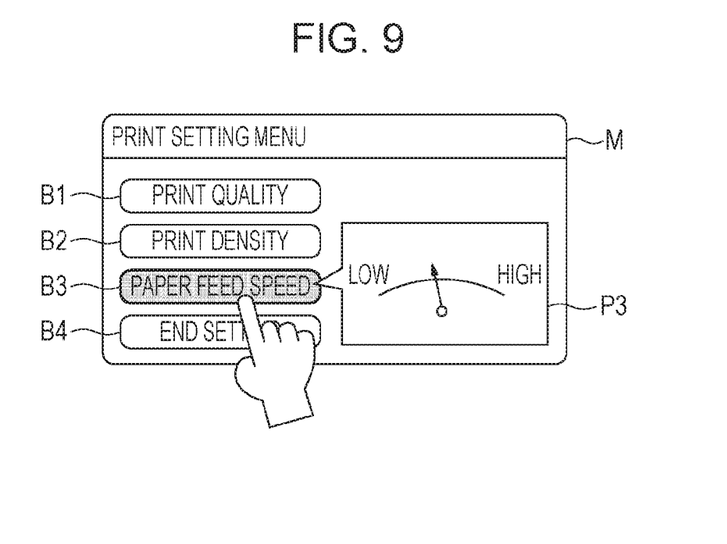
FIG. 9 is a second diagram showing another example of the parameter image.

FIGS. 8 and 9 are diagrams showing another example of the parameter image. Regarding parameters such as "print density" and "paper feed speed" where the setting value can be represented by a numerical value or a quantity, the temporary setting value can be shown by a meter-like display as shown in FIGS. 8 and 9. In the example in FIG. 8, the "print density" parameter can be set to multiple levels from a lowest density to a highest density, and the temporary setting value of the "print density" parameter is represented by the color of the bar-graph-like meter. The display of the bar graph in the parameter image P2 changes according to the magnitude of the pressing force to the button B2.

In the example of FIG. 9, the "paper feed speed" parameter can be set by continuously changing the speed from a lowest speed to a highest speed. In a parameter image P3, the temporary setting value is presented by a display that looks like a rotary meter in which a position of an indicator needle changes according to the temporary setting value. The position shown by the indicator needle displayed in the parameter image P3 changes according to the magnitude of the pressing force to the button B3.

According to these display modes, the user can intuitively perceive an increase/decrease of the temporary setting value according to the change of the pressing force. Therefore, it is easy to quickly set the temporary setting value to a desired value by adjusting the pressing force.

Figure 10:
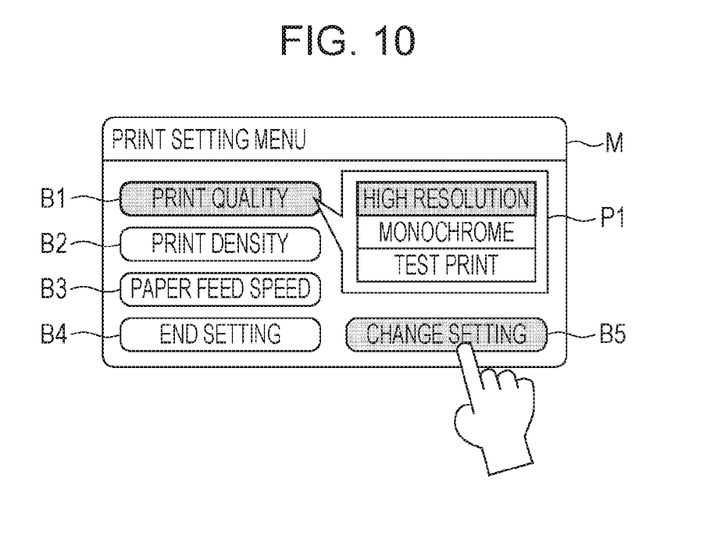
FIG. 10 is a diagram showing another example of a method of setting a parameter.

FIG. 10 is a diagram showing another example of the method of setting a parameter. In the examples described above, the temporary setting value of a parameter corresponding to a pressed button changes according to the pressing force to the buttons B1 to B3 displaying a type of a parameter. On the other hand, in the example shown in FIG. 10, a "change setting" button B5 is displayed in addition to these buttons B1 to B3. After any one of the buttons B1 to B3 is pressed and a type of parameter is selected, when the "change setting" button B5 is pressed, the temporary setting value of the selected parameter changes in the parameter image P1 according to the pressing force to the button B5. Also according to this display mode, the user can quickly and reliably set each parameter to a desired value.

As a method of changing a setting value of a parameter by receiving an operation to the touch panel, for example, a method where the temporary setting value periodically changes while a user continuously presses a button is also considered in addition to the above methods. For example, when the touch panel does not have a resolution with respect to the magnitude of the pressing force, such a method can be preferably applied. However, some time may be required until the temporary setting value reaches a desired value, so that the method is not necessarily effective to quickly perform the setting.

As described above, in this embodiment, the pressing operation of a user to the touch panel 121 is received according to the pressing position and the pressing force. In the parameter setting processing that sets an operation parameter of a printing operation, a parameter associated with a button displayed at a pressed position is to be set. The temporary setting value of the parameter is changed to multiple levels according to the magnitude of the pressing force and a parameter image indicating the temporary setting value is displayed near the button. The user can intuitively perceive a correspondence between the magnitude of the pressing force and the setting value of the parameter from the parameter image, so that the user can select a desired setting value by adjusting the pressing force. Then, the user can decide the setting value of the parameter by a determination operation different from the pressing operation to the button.

As described above, in the embodiment described above, the printer 1 has functions as the "printing apparatus" and the "electronic device" of the invention. When the printer 1 is seen as the "printing apparatus" of the invention, the printer engine 104 functions as a "printing unit" of the invention and the CPU 101 functions as a "print setting unit" of the invention. When the printer 1 is seen as the "electronic device" of the invention, the printer engine 104 and the CPU 101 function as a "processing unit" and a "condition setting unit" of the invention, respectively.

In the embodiment described above, the buttons B1 to B3 corresponding to various operation parameters and the "change setting" button B5 correspond to "operation object" of the invention. The parameter images P1 to P3 correspond to "display object" of the invention.

Second Embodiment

Figure 11:
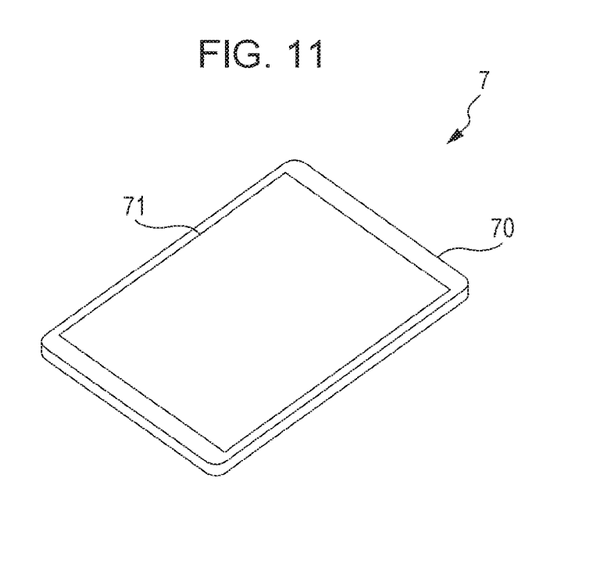
FIG. 11 is a diagram showing an external appearance of a second embodiment of the invention.

FIG. 11 is a diagram showing an external appearance of a second embodiment of the invention. An electronic device 7 in FIG. 11 is a mobile computer that performs various applications and is referred to as a so-called tablet terminal apparatus. In the tablet terminal apparatus 7, almost all of an upper surface of a flat plate-like housing 70 is a touch panel 71. The touch panel 71 displays an image according to an application performed by the tablet terminal apparatus 7 and provides various information to a user. Further, the touch panel 71 receives an operation input due to pressing by the user.

Figure 12:
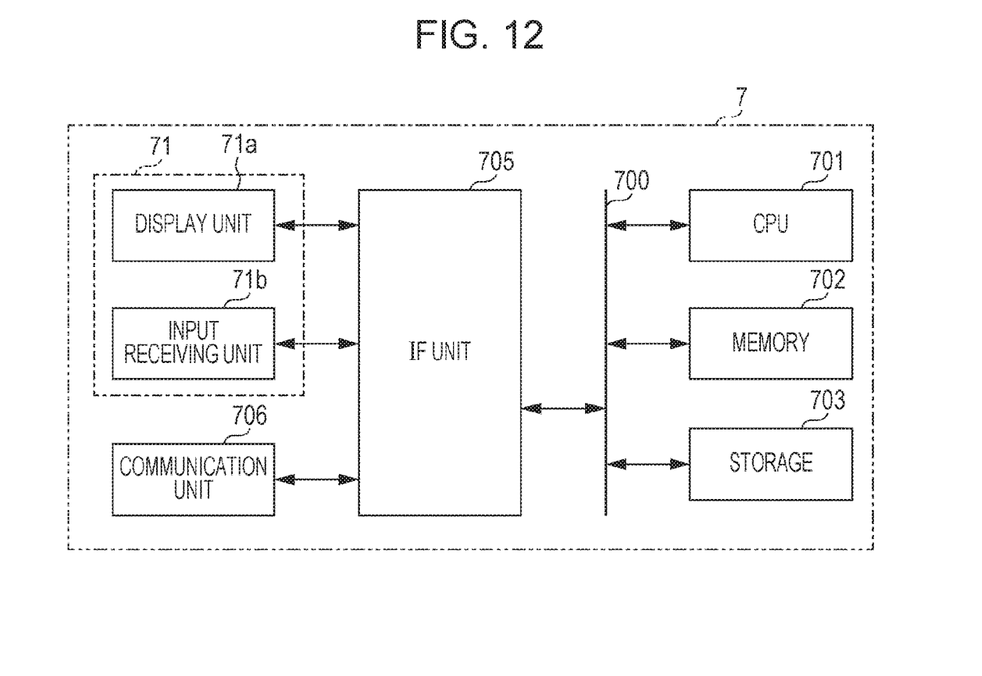
FIG. 12 is a block diagram showing an electrical configuration of a tablet terminal apparatus.

FIG. 12 is a block diagram showing an electrical configuration of the tablet terminal apparatus. As shown in FIG. 12, the tablet terminal apparatus 7 includes a CPU 701, a memory 702, a storage 703, an interface (IF) unit 705, and the like, and these components are communicably connected to each other through an internal bus 700.

The CPU 701 executes a predetermined application program and causes each component the apparatus to perform predetermined processing. The memory 702 stores various data such as data necessary for processing and intermediate data generated by the CPU 701. The storage 703 has a storage capacity greater than that of the memory 702 and can perform long term data storage. The storage 703 stores an application program to be executed by the CPU 701 and various data which are created by execution of the application program or which are given from an external apparatus.

The IF unit 705 controls exchange of information between the tablet terminal apparatus 7, a user, and an external apparatus. Specifically, the IF unit 705 is connected with the touch panel 71 and a communication unit 706. The touch panel 71 includes a display unit 71a that displays an image and an input receiving unit 71b that receives a touch operation by outputting a signal corresponding to a pressing position to a display surface of the display unit 71a and a magnitude of a pressing force. Content of the image displayed on the display unit 71a is determined by display data given from the CPU 701 through the IF unit 705. The signal related to the pressing position and the pressing force, which is outputted from the input receiving unit 71b, is transmitted to the CPU 701 through the IF unit 705. Thereby, the CPU 701 can grasp a user operation content inputted through the touch panel 71. The communication unit 706 has a wired or wireless communication function and performs communication with an external apparatus through an appropriate communication line such as an Internet communication line and a wireless communication line.

The tablet terminal apparatus 7 configured as described above can perform various processing operations by installing the application program that is stored in the storage 703 in advance. As one of the various processing operations, there is a function to remotely control the printer 1 (FIGS. 1 and 2), which is an external apparatus, and set an operation parameter related to a printing operation. In other words, the tablet terminal apparatus 7 has a function of a user interface that lies between the printer 1 and a user performing setting of the printer 1 and reflects an operation input of the user to the setting of the printer 1.

The tablet terminal apparatus 7 can reciprocally communicate with the printer 1 through wireless communication or wired communication performed by the communication unit 706. In the tablet terminal apparatus 7, the CPU 701 executes a program that is stored in the storage 703 in advance and performs parameter setting processing, so that the tablet terminal apparatus 7 can perform setting of various operation parameters of the printer 1.

Processing contents of the parameter setting processing, contents of a GUI screen displayed on the touch panel 71, responses to the operation inputs to the touch panel 71, and the like are the same as those in the first embodiment described above. In other words, the same processing as the parameter setting processing performed by using the touch panel 121 provided in the operation panel 12 of the printer 1 in the first embodiment can be performed by using the touch panel 71 provided in the tablet terminal apparatus 7 of the present embodiment.

Such a tablet terminal apparatus 7 is beneficial for, for example, a service engineer who performs maintenance management of a plurality of printers 1. Specifically, when the service engineer carries one tablet terminal apparatus 7, the service engineer can perform setting operations of a plurality of printers 1 installed in the same installation site or in different installation sites. A maintenance function to check and store an operation condition and the like of each component of the printer 1 may be further provided.

It is possible to omit installation of a touch panel in a printer premised on the parameter setting performed by remote control using such an external apparatus.

In the present embodiment, the tablet terminal apparatus 7 functions as the "electronic device" of the invention. In the present embodiment as the electronic device, the CPU 701 functions as the "condition setting unit" of the invention. Further, an integrated portion of the CPU 701, the IF unit 705, and the communication unit 706 functions as the "processing unit" of the invention, which performs the parameter setting processing as a "processing operation" of the invention.

Others

The invention is not limited to the above embodiments and various modifications can be added to the embodiments described above without departing from the scope of the invention. For example, in the embodiments described above, the printer 1 and the tablet terminal apparatus 7 are illustrated as an example of the "electronic device". However, a device to which the invention is applied is not limited to the printer 1 and the tablet terminal apparatus 7. The invention can be applied to various electronic devices, to which an operation parameter can be set, such as, for example, a device called a PDA (Personal Digital Assistant or Personal Data Assistant; portable information terminal), a game machine, a digital camera, and a musical instrument. Further, for example, the same function may be realized by installing an appropriate application program onto a smartphone.

When the invention is applied to a musical instrument, the technique described above can be applied to setting of various items, where setting is performed by switching a plurality of setting values, such as change of sound volume and change of brightness and contrast of a display apparatus. In the related art, the setting value is switched by operating operation parts such as a slider and radio buttons displayed on a display unit. However, there are users for whom it is difficult to perform detailed operations on the touch panel due to size of finger and strength of force. For such users, it is difficult to operate small operation parts. When the invention is applied, it is not necessary to use such small operation parts, so that even users who are not good at performing detailed operations can easily perform operations. Further, it is possible to appropriately apply the invention to various operations such as switching windows and tabs and switching list items in a combo box.

The types of operation parameters described above, the types of operation inputs that are received, and the display modes in the screen are mere examples in which the invention is implemented, and these types and modes can be appropriately changed according to the function and usage of the electronic device. For example, a mode in which the size, color, and position of a parameter image is changed according to the value of an operation parameter, a mode in which the change of the electronic device generated according to the value of an operation parameter is displayed with animation, and the like are considered.

Further, in the parameter images P2 and P3 of the embodiments described above, an operation parameter that can be represented by a numerical value or a quantity is presented to a user by a meter display. However, for example, a display mode may be used in which a numerical character is changed according to the magnitude of the pressing force. Besides these, various display modes may be applied in which a change of value is visualized and displayed.

Further, for example, in the embodiments described above, a technical idea of the invention is applied in an operation for deciding a setting value of an operation parameter. In addition to this, for example, the above technical idea can be applied to an operation to select any one of a plurality of parameters or a plurality of sub-menus collected in one button on a menu screen.

Further, for example, when a pressing (selecting) operation is performed on a button, a pressure receiving area that receives the pressing operation is set in an area other than the button and an operation parameter may be changed according to a pressing force to the pressure receiving area. Thereby, it is possible to reduce a risk that an operation mistake of a user occurs. Further, by setting sensitivity of the pressure receiving area higher than that of a touch panel where the button is arranged, it is possible to reduce cost by minimizing use of a touch panel whose sensitivity is high and whose price is also high. As a result, it is also possible to provide a touch panel, where a selection range of an operation parameter is large, to a user at a low price.

What is claimed is:
1. A printing apparatus comprising:
   a printer engine configured to perform a printing operation;
   a processor configured to set the printing operation; and
   a touch panel configured to display an object related to a setting of a printing operation and receive a pressing operation,
   wherein the touch panel is configured to:
      display an operation object corresponding to a multi-level changeable operation parameter of the printing operation, and
      when the pressing operation is performed on a position where the operation object is displayed, change a temporary setting value of the operation parameter, which is shown by a display object displayed at a position different from that of the operation object, according to a magnitude of a pressing force,
   wherein the processor is communicatively coupled to the printer engine and the touch panel, and
   wherein the processor is configured to decide the temporary setting value, which is obtained when a determi- nation operation different from the pressing operation is performed on the touch panel, as a setting value of the operation parameter.

2. The printing apparatus according to claim 1, wherein an operation where a pressing position moves from a state in which the operation object is pressed is defined as the determination operation.

3. The printing apparatus according to claim 1, wherein a pressure applied to a position different from a position where the operation object is pressed is defined as the determination operation.

4. The printing apparatus according to claim 1, wherein the touch panel is further configured to display the display object in which a magnitude of the temporary setting value of the operation parameter is meter-displayed.

5. The printing apparatus according to claim 1, wherein the display object is displayed near the operation object.

6. The printing apparatus according to claim 1, wherein the display object is displayed near a pressing position.

7. An electronic device for managing operation parameter settings, comprising:
   a processor configured to set a processing condition of a processing operation; and
   a touch panel configured to display an object related to the setting and receive a pressing operation,
   wherein the touch panel is configured to:
       display an operation object corresponding to a multi-level changeable operation parameter of a processing operation, and
       when the pressing operation is performed on the touch panel on a position where the operation object is displayed, change a temporary setting value of the operation parameter, which is shown by a display object displayed at a position different from that of the operation object, according to a magnitude of a pressing force, and
   wherein the processor is communicatively coupled to the touch panel, and
   wherein the processor is configured to:
       decide the temporary setting value, which is obtained when a determination operation different from the pressing operation is performed on the touch panel, as a setting value of the operation parameter, perform the processing operation.

8. The electronic device according to claim 7, wherein an operation where a pressing position moves from a state in which the operation object is pressed is defined as the determination operation.

9. The electronic device according to claim 7, wherein a pressure applied to a position different from a position where the operation object is pressed is defined as the determination operation.

10. The electronic device according to claim 7, wherein the touch panel displays the display object in which a magnitude of the temporary setting value of the operation parameter is meter-displayed.

11. The electronic device according to claim 7, wherein the display object is displayed near the operation object.

12. The electronic device according to claim 7, wherein the display object is displayed near a pressing position.

* * * * *